United States Patent
Straub et al.

(10) Patent No.: US 7,865,581 B2
(45) Date of Patent: Jan. 4, 2011

(54) REMOTE MANAGEMENT METHOD OF A DISTANT DEVICE, AND CORRESPONDING VIDEO DEVICE

(75) Inventors: Gilles Straub, Acigne (FR); Helmut Burklin, Rennes (FR)

(73) Assignee: Thomson Licensing, Boulogne-Billancourt (FR)

( * ) Notice: Subject to any disclaimer, the term of this patent is extended or adjusted under 35 U.S.C. 154(b) by 550 days.

(21) Appl. No.: 11/918,385

(22) PCT Filed: Apr. 14, 2006

(86) PCT No.: PCT/EP2006/003472

§ 371 (c)(1),
(2), (4) Date: Oct. 12, 2007

(87) PCT Pub. No.: WO2006/108685

PCT Pub. Date: Oct. 19, 2006

(65) Prior Publication Data

US 2009/0064268 A1 Mar. 5, 2009

(30) Foreign Application Priority Data

Apr. 15, 2005 (EP) ............................ 05290848

(51) Int. Cl.
*G06F 15/177* (2006.01)
*G06F 15/173* (2006.01)
*H04N 7/16* (2006.01)
*H04N 7/18* (2006.01)
*H04N 7/173* (2006.01)
*G06F 11/00* (2006.01)

(52) U.S. Cl. .................. 709/221; 709/224; 725/152; 725/55; 725/107; 725/132; 725/140; 714/100

(58) Field of Classification Search ............... 725/152, 725/85, 107, 132, 140; 709/221, 224; 714/100
See application file for complete search history.

(56) References Cited

U.S. PATENT DOCUMENTS

| 6,922,731 B1 * | 7/2005 | Morioka et al. ............ 709/231 |
| 7,346,698 B2 * | 3/2008 | Hannaway ................. 709/231 |
| 2002/0095484 A1 * | 7/2002 | Pagani et al. ............... 709/220 |
| 2004/0133669 A1 * | 7/2004 | Jalonen et al. ............. 709/224 |
| 2004/0244058 A1 * | 12/2004 | Carlucci et al. ............ 725/135 |

FOREIGN PATENT DOCUMENTS

EP 0987894 3/2000

OTHER PUBLICATIONS

J. Bernstein (Editor) et al: "CPE WAN management Protocol" Technical Report DSL Forum, No. TR-69. Apr. 1, 2004, pp. 1-109.
Search Report Dated Sep. 14, 2006.

* cited by examiner

*Primary Examiner*—Hoang-Vu A Nguyen-Ba
(74) *Attorney, Agent, or Firm*—Robert D. Shedd; Jeffrey M. Navon

(57) ABSTRACT

The invention concerns a remote management method enabling a distant remote management server to manage at least a distant device. In order to have a simple and reliable management, it comprises a transmission step of a CWMP command requesting a configuration of the transport and/or dejittering layers.

7 Claims, 6 Drawing Sheets

REMOTE MANAGEMENT METHOD OF A DISTANT DEVICE, AND CORRESPONDING VIDEO DEVICE

This application claims the benefit, under 35 U.S.C. §365 of International Application PCT/EP2006/003472, filed Apr. 14, 2006, which was published in accordance with PCT Article 21(2) on Oct. 19, 2006 and republished Dec. 21, 2006 in English and which claims the benefit of European patent application No. 05290848.0 filed Apr. 15, 2005.

1. INVENTION FIELD

Present invention is related to the field of digital television and more precisely to remote management of a video device (e.g. a set top box (or STB)).

2. TECHNOLOGICAL BACKGROUND

A CPE (or Customer Premises Equipment) WAN (or Wide Area Network) Remote Management Protocol also called CWMP is defined in DSL (or Data Subscriber Line) Forum Technical report referred as TR-069. TR-069 (entitled "*CPE WAN Management Protocol*", DSL Forum Technical Report, published on May 2004) defines a remote management protocol stack and a data model for an Internet Gateway Device (basically a DSL Modem). TR 106 (previously WT106: Generic data model compliant to TR-069) (extends to data model to any kind of device and gathers everything being generic to a device) discloses a generic data model. TR1 (previously WT111: mechanisms required to perform remote management of a LAN device via a routed IGD (DSL modem)) discloses two mechanisms to manage a home device behind a home gateway from a distant server.

No remote management standard exists for the STB, being compliant to TR-069. Any remote management of STBs are currently based on proprietary solutions and basically based on SNMP (or "Simple Network Management Protocol"), which is not reliable and flexible enough (SNMP is using message exchange over UDP).

3. INVENTION SUMMARY

The object of the invention is to alleviate these disadvantages of the prior art.

More precisely, the aim of the invention is to improve the reliability of management of video devices, while having a simple management implementation.

Consequently, the invention proposes a remote management method enabling a distant remote management server to manage at least a distant device. In order to have a simple and reliable management, the method comprises a transmission step of a CWMP command requesting a configuration of the transport and/or dejittering layers.

According to an advantageous feature, the configuration comprises an enable or disable of the RTP and/or video stream dejittering in the at least distant device.

Advantageously, configuration comprises a initial level of at least one buffer in the at least video device. The buffer or buffers can be a RTP or video stream (e.g. MPEG-TS) buffer).

According to a specific feature, the configuration comprises a clock recovery setting of the at least one video device.

According to another feature, the configuration comprises a configuration of jittering alarm triggered by the set top box. It can be a soft alarm that gives indication of Service Level Agreement to avoid lost of packets.

According to an advantageous feature, the configuration comprises a configuration of the priority of the IGMP traffic issued from the set top box. This feature can has an impact on the zapping delay and enable to have a more efficient zapping if there is high traffic load on the uplink.

According to a specific feature, the method comprises a transmission step of a CWMP message requesting statistical data.

The invention concerns also a remote management method enabling a video device to be managed by a distant management server; to enable an simple and reliable of a video device, it comprises a reception step of a CWMP message requesting a configuration of the transport and/or dejittering layers.

According to a specific feature, the method comprises a configuration step as requested by the CWMP message.

The invention is also related to a video device comprising buffers to store received audio/video data. To be easily and reliably manage by a distant server, the video device comprises a reception means of a CWMP message requesting a configuration of the transport and/or dejittering layers and means to configure the device according to the CWMP message.

This video device is, for instance a set top box and/or a proxy.

4. LIST OF FIGURES

The invention will be better understood and other features and advantages will appear on reading the following description, the description making reference to the appended drawings amongst which:

5. DETAILED DESCRIPTION OF THE INVENTION

This specification defines the data model, according to the invention, for provisioning of a video device (for example a set-top-box (STB) CPE device) by a remote server (for example an Auto-Configuration Server (ACS)) enabling a configuration of the video device (for example, a STB or Set Top Box) using the mechanism defined in TR-069 (as published in May 2004).

The following terminology is used throughout this document:

ACS or Auto-Configuration Server: this is a component in the broadband network responsible for auto-configuration of the CPE for advanced services;

CPE or Customer Premises Equipment;

Parameter: A name-value pair representing a manageable CPE parameter made accessible to an ACS for reading and/or writing;

STB or Set Top Box: this device contains Audio Video decoders and is intended to be connected to Analog TV and or Home Theaters.

This document defines a STB Device as the container associated with the provisioning objects for STB CPE. CPE making use of a STB Advantageously, device object adheres to all of the data-hierarchy requirements defined in TR106. In the context of TR106, the STB Device object is a top-level application-specific object (an Application Object as defined in the formal data-hierarchy definition). As such, individual CPE devices may contain one or more of these objects within their Root Object along side the generic data objects defined in WT106. The presence of more than one STB Device object would be appropriate primarily where a CPE device serves as a management proxy for other non-TR-069 capable STB CPE. For example, an Internet Gateway Device might serve as a management proxy for one or more non TR069 capable STBs (such as free to air STBs). Then, if a video device is not compliant with TR069, a local proxy (in a local gateway or other video device) can handle TRO69 requests and responses, and manage protocol translations so that the video device can be remotely managed by a distant server.

Figure 1:
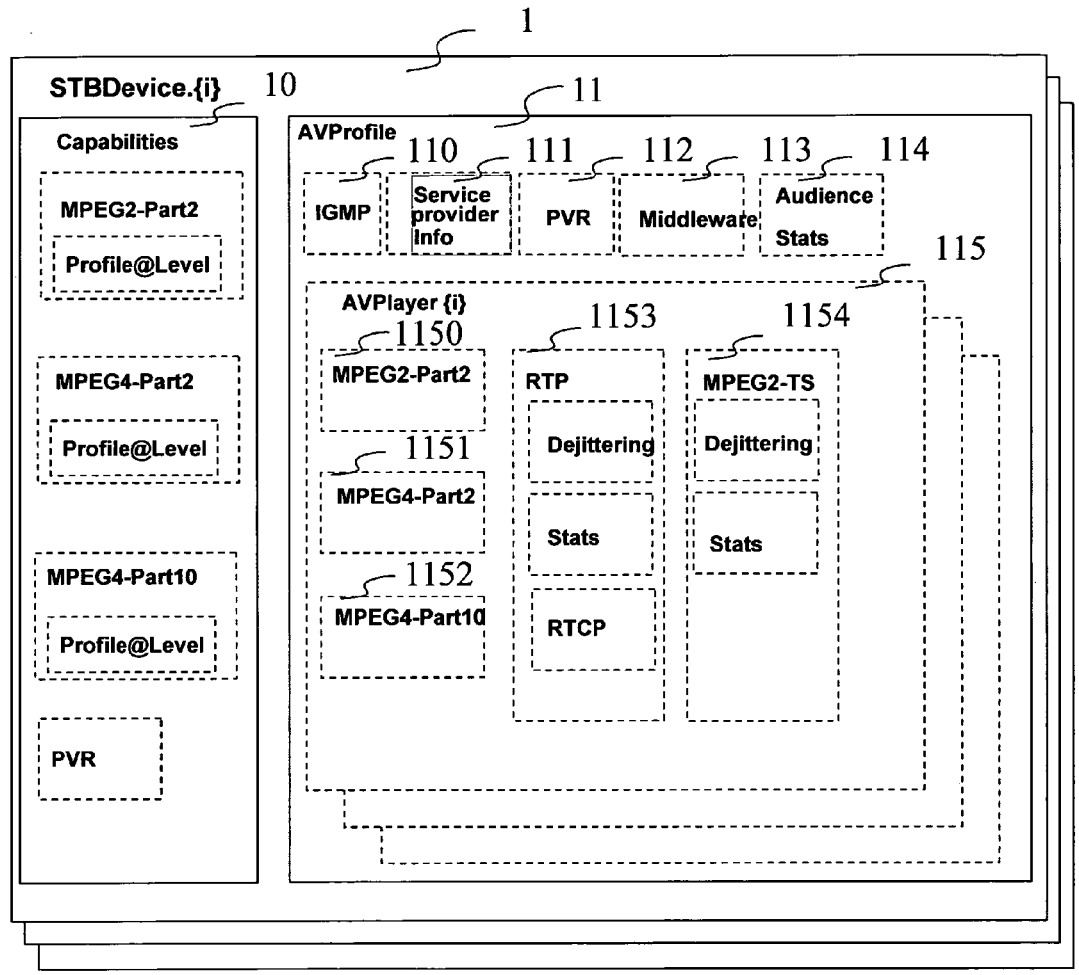
FIG. 1 illustrates a video Device object structure according to a particular embodiment of the invention.

FIG. 1 illustrates a Device object structure 1 (the device is, for example, a Set Top Box) according to a particular embodiment of the invention.

Each STB or video device can manage its configuration and data according to FIG. 1. A remote server can have an object structure (entirely or partially) for some or all video device that it can control, as illustrated in FIG. 1.

The object structure 1 that can be implemented in software or hardware comprise two main sub-structures capabilities 10 and Audio/video Profile 11.

Capabilities are related to MPEG2-Part 2 and/or MPEG4 part 4 (both related to video decoding), and/or MPEG4 part 10 (related to video H264 standard), and/or PVR (or Personal Video Recorder). Then, a STB decoder is able to recognize the AudioVideo (or AV) standard by itself (H264/MPEG2) and does not need to be remotely configured for that. Tables are used to specify profile and levels: capabilities are described as a table of profile@level entries. Audio is specified as a parameter of the video decoder because there may be restrictions such as some audio formats cannot be played with any video format. However we consider that for a video standard (MPEG2 part 2 or MPEG4 part2 or MPEG4 part10), any audio standard can be played with any profile (or profile@level).

The Audio/video profile 11 contains data related to several type of features and especially:
IGMP (or "Internet Group Management Protocol") profile data 110 (including IGMP priority);
Service Provider informations 111;
PVR profile 112;
Middleware profile 113;
Audience statistics 114; and
AV (or AudioNideo) player profile 115.
The AV player profile 115 comprises:
a MPEG2-Part 2 profile 1150;
a MPEG4-Part 2 profile 1151;
MPEG4-Part 10 profile 1152;
an RTP (or Realtime Transport Protocol implemented over UDP/IP (User Datagram Protocol over Internet Protocol) profile 1153, that comprises profiles related respectively to dejittering, statistics and RTCP (or Realtime Transport Control Protocol); and
a MPEG2-TS (or Motion Picture Expert Group 2-Transport Stream) profile 1154 that comprises profiles related respectively to dejittering and statistics (In case of MPEG2-TS a dejittering buffer is used per MPEG2-TS stream (i.e IP address)).

According to the invention, some of these profiles can be managed remotely by a remote server (eg ACS) and especially: the IGMP profile 110, the audience statistics profile 114, the RTP profile 1153 and the MPEG2-TS profile 1154.

Figure 2:
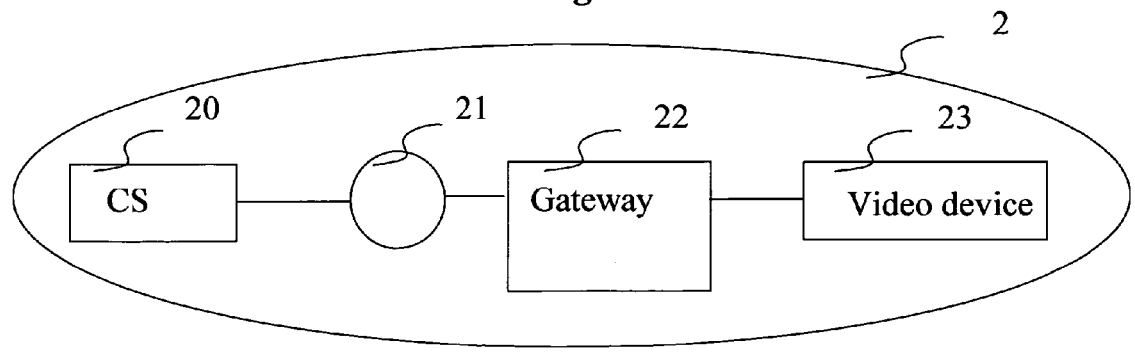
FIG. 2 illustrates a network architecture implementing the video device object structure according to FIG. 1.

FIG. 2 illustrate a network architecture 2 that comprises:
at least a configuration server (e.g. an ACS) 20;
a network core 21 (e.g. a wide area network (e.g. an ADSL (Asymetric Digital Subscriber Line) network));
one or preferably several video devices 23 (e.g. set top boxes) associated each to a gateway 22 (video device 23 and associated gateway 22 are either embedded as part of an Internet Gateway Device, as defined in TR-069, or standalone devices, i.e. the device 23 and the gateway 22 can be made in one or two separate devices) (as a variant of the invention, if a video device 23 is not compliant with TR069, a dedicated proxy can be inserted between gateway 22 and device 23).

The video devices 23 and the configuration server are communicating through the gateway 22 and the network core 21. The video devices 23 are implementing the video device object structure according to FIG. 1.

Figure 3:
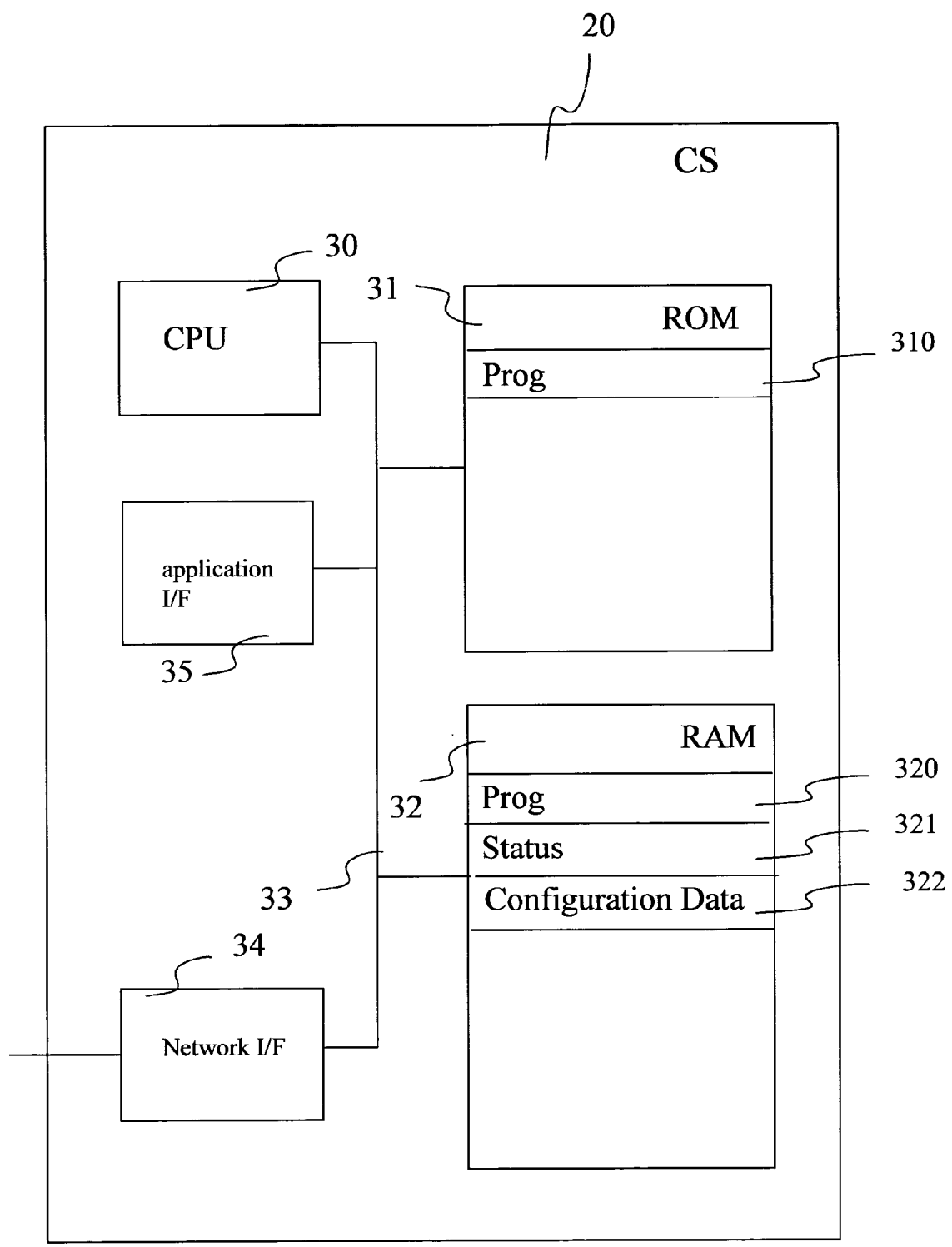
FIGS. 3 and 4 shows respectively a configuration server and a video device according to particular embodiments of the invention and belonging to the network of FIG. 2.

FIG. 3 illustrates schematically the configuration server 20. The server 21, comprises:
a microprocessor 30 (or CPU);
a non-volatile memory of type ROM (Read Only Memory) (or hard disk) 31;
a random access memory or RAM 32; et
an application interface internet 36 enabling communication with a user or control machine;
a network interface 34 enabling to exchange (send to and/or receive from) data or control frames (typically CWPM frames) with a video device 23 through the core network 21;
a data and address bus 33 linking elements 30 to 32, 34 and 35.

Each of elements 30 to 35 are well known by those skilled in the art. <<Register>> word used here can correspond in RAM 320 or ROM 310 to a memory area of small size (a few binary data) or a large memory area (e.g. a program or audio/video data).

Figure 4:
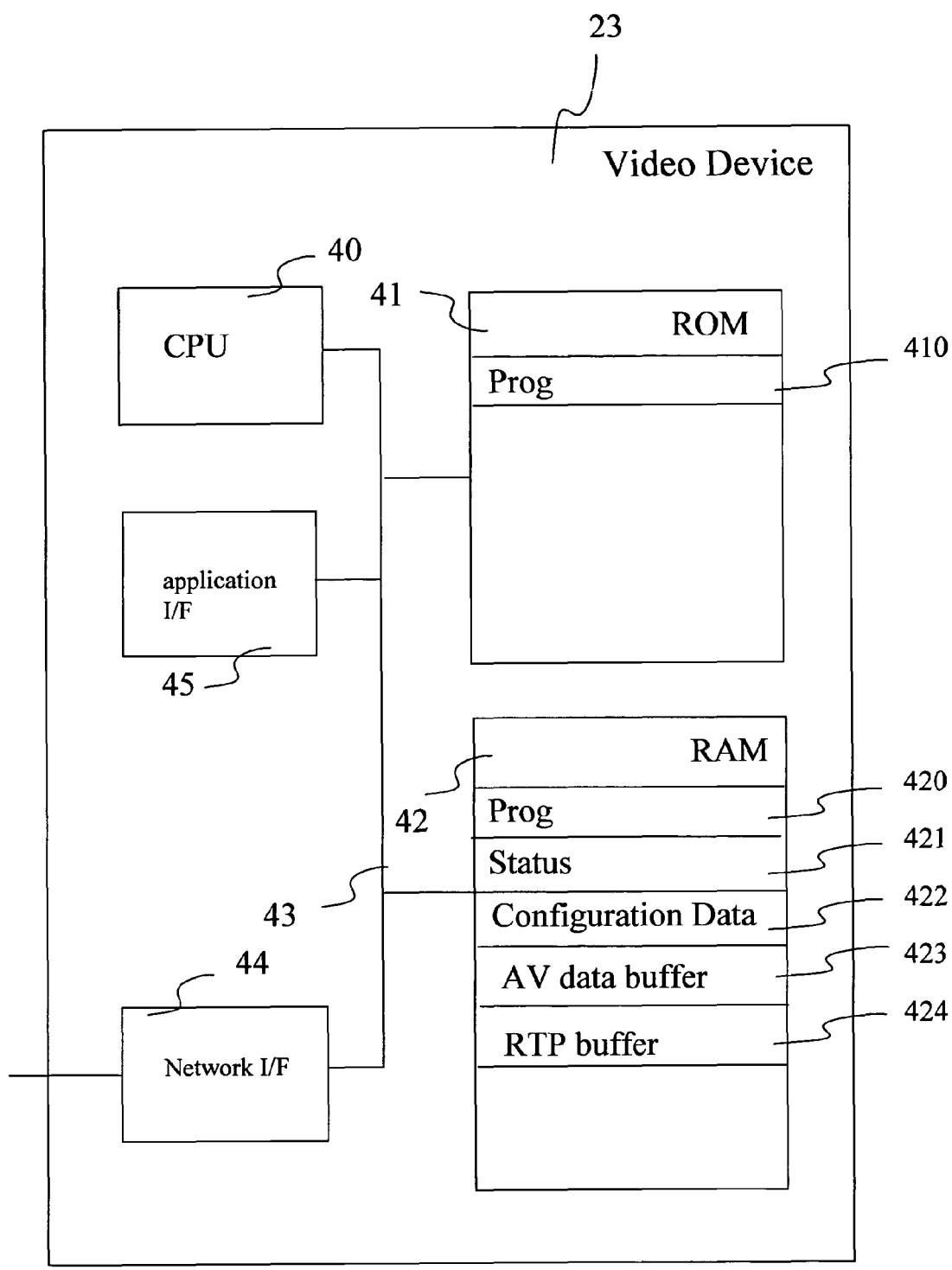

The ROM 31 comprises a program 310. The algorithm implementing the method of FIG. 4 are stored in ROM 61 associated to the server 20 implemented the steps of the method. At power on, the CPU 30 download the program 310 into RAM 32 and executes its instructions.

RAM 32 comprises, especially:
in a register 320, a program used by the CPU 30, that is download at the power on of the server 20;
various status in a register 321 (e.g. audience statistics related to one or several video devices 23); and
various configuration data in a register 322 (e.g. profiles 110, 1153 and 1154 statistics related to one or several video devices 23).

FIG. 4 illustrates schematically the video device 23. The video device 23, comprises:
a microprocessor 40 (or CPU);
a non-volatile memory of type ROM (or hard disk) 41;
a RAM 42; et
an application interface internet 46 enabling communication with a user, a display and/or a audio/video decoding, recording and/or playing device;
a network interface 44 enabling to exchange (send to and/or receive from) data or control frames (typically CWPM frames) with a configuration server 20 through the core network 21 and the gateway 20 associated to the video device;

a data and address bus 43 linking elements 40 to 42, 44 and 45.

Each of elements 40 to 45 are well known by those skilled in the art.

Figure 5:
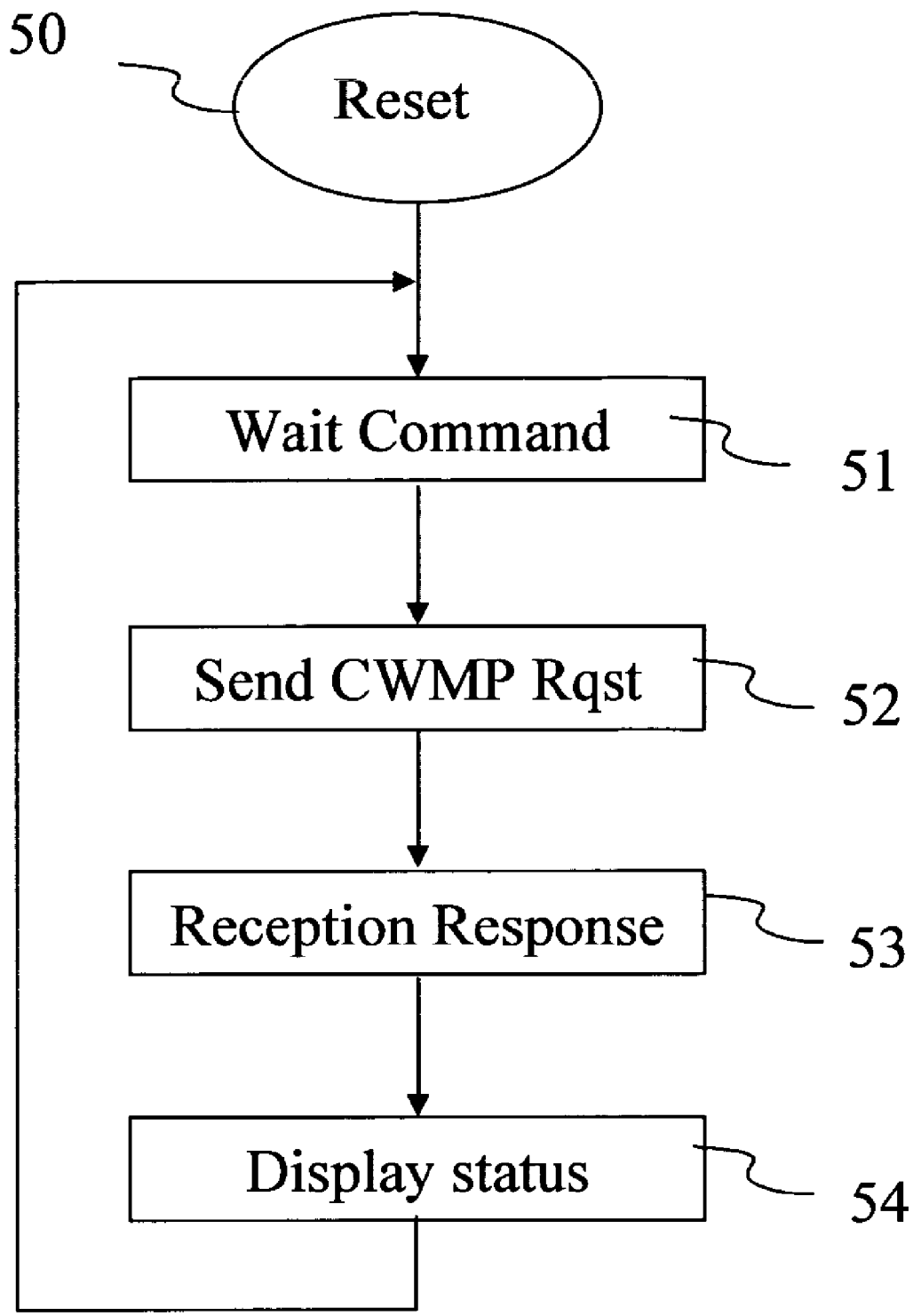
FIGS. 5 and 6 illustrates each a method that is implemented respectively in the server of FIG. 3 and the video device of FIG. 4, according to the specific embodiments of the invention.

The ROM 41 comprises a program 410. The algorithm implementing the method of FIG. 5 are stored in ROM 41 associated to the device 23 implemented the steps of the method. At power on, the CPU 40 download the program 410 into RAM 42 and executes its instructions.

RAM 42 comprises, especially:

in a register 420, a program used by the CPU 40, that is download at the power on of the device 23;

various status in a register 421 (e.g. audience statistics related to the audio/video data received by the device 23); and various configuration data in a register 422 (e.g. profiles 110, 1153 and 1154 related to the device 23);

an audio/video data buffer 423 that stores audio/video data received from a distant video server or broadcast before transfer to an application (via interface 45); and a RTP buffer 424 that stores the RTP frames to send and RTP received frames (If RTP is used an additional dejittering buffer 424 can be used).

FIG. 5 discloses a method that is implemented in the configuration server 20 according to the specific embodiments of the invention.

The method begins with an reset step 50, where the different configuration data of the server 20 itself are initialized (e.g. IP address of devices 23, their profiles, configuration data related to the audio/video broadcaster, user and/or control machine).

Then, during a step 51, the server 20 waits and receives a command from a user or control machine through the application interface 35.

Then, during a step 52, the server 20 build a CWMP request according to the command received at step 51 and send it to one or several video devices 23 (according to the command).

Then, during a step 53, the server 20 waits and receives a response from each of the destinee of the CWMP request sent during step 52. As a variant, a time-out can be set up during the step 52 and the server wait a response till all expected answers are received or at expiration of time-out.

Then, during a step 54, the server send a status to the user or control machine that send the command during step 51, e.g. for display. Finally, step 51 is reiterated.

According to the invention several commands can be received by the server during step 51, especially:

a configuration of the dejittering in buffers of the video device, e.g. the RTP buffer 424 or audio-video buffer 423 (typically MPEG-TS buffer); this configuration can enable or disable a specific configuration, and/or define the minimum threshold (or initial level of these buffers before begin of emptying them) and/or define the minimum and/or maximum size of these buffers;

a configuration of the set top box clock recovery mechanism (the mechanism and the buffer initial level have to be consistent);

a configuration of jittering alarm triggered by the set top box (soft alarms that give indication of Service Level Agreement to avoid lost of packets);

configuration of the priority of the IGMP traffic issued from the set top box (that can influence the zapping delay and enable it more efficient if there is a congestion on the uplink; and remote retrieve of data such as audience statistics relative to the video device usage or identification of probable cause of delivery problems.

The CWMP requests is following a structure of standard commands as defined in TR-069 as follows:

the request based upon SetParameterValues as defined in section A.3.2.1 of TR-069 in table 9 to send a configuration request to one or several video device according to a step 51 command;

the request based upon GetParameterAttributes as defined in section A.3.2.5 of TR-069 in table 20 to send a request to one or several video device for retrieve of data such as audience statistics relative to the video device usage or identification of probable cause of delivery problems.

The corresponding CWMP response related to a step 53 is following a structure of standard responses as defined in TR-069 as follows:

the response based upon SetParameterValuesResponse as defined in section A.3.2.1 of TR-069 in table 10 to retrieve the status of the configuration request from one or several video device;

the response based upon GetParameterAttributesResponse arguments as defined in section A.3.2.5 of TR-069 in table 21 to retrieve of data such as audience statistics relative to the video device usage or identification of probable cause of delivery problems.

For each command and/or response, specific type of information and format are given in table 1 which lists a complete data model at the end of this description. Main objects of the datamodel related to the above listed commands are detailed hereafter.

When command related to a configuration of the dejittering of a RTP buffer is received during step 51, the configuration server 20 sends to the corresponding video device(s) 23 a request SetParameterValues including the object STBDevice.{i}.AVProfile.AVPlayer.{i}.RTP. DejitteringEnable (STBDevice.{i}.AVProfile.AVPlayer.{i}.RTP. representing AV profile parameters related to an AV stream sent via RTP) with a boolean set to enable or disable the dejittering of the RTP buffer 424 according to the command of step 51.

When command related to a configuration of the dejittering of a audio/video buffer is received during step 51, the configuration server 20 sends to the corresponding video device(s) 23 a request SetParameterValues including the object STBDevice.{i}.AVProfile.AVPlayer.{i}.MPEG2-TS. DejitteringEnable with a boolean set to enable or disable the dejittering of the audio/video buffer 423 according to the command of step 51. In the defined objects, {i} refers to one possible instance of a video device (if several instances are used). In general manner, Object.{i} is used to indicate that several instances of Object is possible.

According to the invention, there is a possibility to manage MPEG2 TS encapsulation and RTP encapsulation separately (allows both MPEG2TS only, and MPEG2TS over RTP). In particular it is advantageous not to duplicate the MPEG2TS part for the mode MPEG2TS only and MPEG2TS over RTP. This allows to select the transport layer from the remote management server (ACS for Access and Control Server): MPEG2TS only, or MPEG2TS over RTP.

According to the invention, the MPEG2TS or MPEG2-TS over RTP can be activated or not. Then, the operator or video broadcaster can activate the RTP transport stack (activating or deactivating of RTP dejittering comprising the processing of RTP time stamp) without download of a complete transport layer stack in the video device. Then, this operation is simple and cheap to implement.

According to the invention, it is also possible to change the initial dejittering buffer level (e.g. RTP dejittering and/or MPEG2-TS dejittering) that also directly impacts the zapping time. When initiating a video rendering, the set top box waits for a given level of RTP or video stream (MPEG2-TS) buffer filling before beginning the decoding of the video. By allowing this parameter to be changed, it is possible to optimize the zapping time depending on it. The initial dejittering buffer level depends on the network jitter (packet delay variation) and is used to prevent the buffer gets empty. This parameter can be advantageously remotely changed according to the variation of packet delay.

When command related to a configuration of the initial size of audio/video buffer is received during step 51, the configuration server 20 sends to the corresponding video device(s) 23 a request SetParameterValues including the object STBDevice.{i}.AVProfile.AVPlayer{i}.MPEG2-TS. Dejittering.BufferInitialLevel (STBDevice.{i}.AVProfile.AVPlayer{i}. MPEG2-TS. Dejittering representing AV profile parameters related to the dejittering of an AV stream using MPEG2-TS transport) with a number set to the value of the number of bytes that is in the buffer 423 before play-out can start according to the command of step 51. This value preferably depends on packet delay variation and has an influence on the zapping delay. According to state of the art, the initial size is fixed.

According to the invention, it is also possible to change the initial buffer size (possibly at the same time as the dejittering levels).

When a command related to a configuration of the size of audio/video buffer is received during step 51, the configuration server 20 sends to the corresponding video device(s) 23 a request SetParameterValues including the object STBDevice.{i}.AVProfile. AVPlayer{i}.MPEG2-TS.Dejittering.BufferSize with a number (MPEG2 TS dejittering buffer size in bytes) set to the value of the size of the buffer 423 according to the command of step 51.

The invention allows also to remotely selecting the decoder clock recovery mechanism (according to state of the art, it is burned in the decoder) in the video device. It is possible to dynamically choose to use or not the PCR (or Program Clock Reference) clock control. According to state of the art, decoder clocks are freely running (FREE mode) as the jitter of IP network is too big for classical methods. Then, according to state of the art, decoder clocks can drift and buffers can empty or overload. According to state of the art, only CBR (Constant Bit Rate) can be used to transfer of video. According to the invention, it is possible to change this mode into a PCR_LOCKED mode; a PCR clock recovery (PCR_LOCKED) allows to use smaller initial buffer level (and reduce the zapping delay). It is also applicable to VBR (Variable Bit Rate). According to the invention, the configuration server indicates to the video device that its clock can run freely or take into account information coming from the PCR.

When command related to a configuration of the initial size of audio/video buffer is received during step 51, the configuration server 20 sends to the corresponding video device(s) 23 a request SetParameterValues including the object STBDevice.{i}.AVProfile.AVPlayer{i}. MPEG2-TS. Dejittering.OperationMode with a string set to "PCR LOCKED" (that means that reading of the buffer is locked on received PCRs) or "FREE" (that means that reading is based on a free running clock; when the FREE mode is used, the BitRate parameter is used to determine the play out clock) according to the command of step 51.

According to the invention, it is also possible to program alarm thresholds (configure the buffer level to generate an alarm), this may be used to detect SLA (Service Level Agreement) violation and enables a fine remote tuning of the alarm threshold.

When command related to a configuration of alarm thresholds is received during step 51, the configuration server 20 sends to the corresponding video device(s) 23 a request SetParameterValues including the objects STBDevice.{i}.AVProfile.AVPlayer{i}.MPEG2-TS.Dejittering. BufferAlarmLowLevel and STBDevice.{i}.AVProfile.AVPlayer{i}.MPEG2 TS.Dejittering.BufferAlarmHighLevel with the integers set to the value of the buffer level (in number of bytes) that will generate a buffer respectively under or over flow event according to the command of step 51.

According to the invention, it is also possible to remotely manage the DSCP or Ethernet Tags of upstream IGMP packets (and so to change their priority) so that to change the performances of the zapping. By offering this option, it is possible for the operator to modify the priority given to the IGMP packets used for the zapping relatively to the voice over IP traffic, the visio conferencing traffic or the gaming traffic.

When command related to a configuration of IGMP priority is received during step 51, the configuration server 20 sends to the corresponding video device(s) 23 a request SetParameterValues including the object STBDevice.{i}.AVProfile.IGMP.field (Audio/video profile parameters that are specific to IGMP clients when it is used for channel zapping) where field is one of the following arguments, according to the command of step 51:
  integer DSCPMark that represents Diffserv code point to be used for outgoing IGMP packets;
  integer VLANIDMark that represents the identifier VLAN ID (as defined in IEEE 802.1Q) to be used for outgoing IGMP packets for this profile; value of −1 indicates the default value is to be used; and
  integer EthernetPriorityMark that represents Ethernet priority code (as defined in IEEE 802.1D) to be used for outgoing IGMP packets for this profile; a value of −1 indicates the default value is to be used; if either the VLANIDMark or EthernetPriorityMark are greater than zero, then the outgoing frames are tagged; otherwise, the outgoing frames may be tagged or untagged.

According to the invention, it is also possible to record user audience (what the user is viewing) to do audience statistics.

When command related to audience statistics is received during step 51, the configuration server 20 sends to the corresponding video device(s) 23 a request GetParameterAttributes including the object STB.Device.{i}.AVProfile.AudienceStats (table to describe audience measurements; the purpose of this table is to record what the video device has been receiving; time duration are recorded only for services being received in the main screen; each entry corresponds to a given service) with the following arguments, according to the command of step 51:
  integer EntryID that represents a unique identifier for each entry in this table; and
  string ServiceName that describes a TV channel;

During step 53, the video device (s) answers with a response GetParameterAttributesResponse with STB.Device.{i}.AVProfile. AudienceStats being an array of the following data:
  integer EntryID that represents a unique identifier for each entry in this table;
  string ServiceName that describes a TV channel;
  integer Duration that describes the cumulative duration of this service in seconds.

When command related to a reset of audience statistics is received during step 51, the configuration server 20 sends to the corresponding video device(s) 23 a request SetParameter- Values including the object STB.Device.{i}.AVProfile.AudienceStats.Reset according to the command of step 51:

According to the invention, it is also possible to retrieve, not only the number of lost packets, but also the number of packets received with a bad CRC. Doing this allows to identify the probable cause of problems occurring in content delivery. Network congestion will lead to lost packets while a lot of packets received with bad CRC will be the sign of a probable bad ADSL link. Then, when retrieving statistics related to the AV stream is it possible to have a diagnostic of a problem or a confirmation that all is working. This can be done advantageously in consistency with a configuration request as described above according to the invention. More generally, the invention provides several tools to service providers to manage video devices such as STB in an open way. The management of video device will allow user troubleshooting (accelerate failure identification when the user calls a help desk) and help to determine whether the failure comes from

- user problem (he did something wrong such as he did not connect the STB);
- device problem (the device is out of order); and/or
- network problem.

When command related to MPEG2-TS statistics is received during step 51, the configuration server 20 sends to the corresponding video device(s) 23 a request GetParameterAttributes including the object STBDevice.{i}.AVProfile.AVPlayer{i}.MPEG2-TS.Stats (Statistics for AV stream instance) with at least one of the following arguments, according to the command of step 51:

- integer PacketsReceived that represents the total number of MPEG2 TS packets received for this stream;
- integer PacketsLost that represents the total number of MPEG2 TS packets that have been lost for this stream;
- integer Overruns that represents the total number of times the receive jitter buffer has overrun for this stream; and
- integer Underruns that represents the total number of times the receive jitter buffer has underrun for this stream.

During step 53, the video device (s) answers with a response GetParameterAttributesResponse with STBDevice.{i}.AVProfile. AVPlayer{i}.MPEG2-TS.Stats associated with the arguments as described above.

When command related to a reset of AV stream statistics is received during step 51, the configuration server 20 sends to the corresponding video device(s) 23 a request SetParameterValues including the object STBDevice.{i}.AVProfile.AVPlayer{i}. MPEG2-TS.Stats.ResetStatistics, according to the command of step 51. Advantageously, AV stream statistics may also be reset when read.

When command related to RTP statistics is received during step 51, the configuration server 20 sends to the corresponding video device(s) 23 a request GetParameterAttributes including the object STBDevice.{i}.AVProfile.AVPlayer{i}.RTP.RTCP.Stats (this object being associated to statistics for RTP stream instance) with at least one of the following arguments, according to the command of step 51:

- integer PacketsReceived that represents the total number of RTP packets received for this stream;
- integer BytesReceived that represents the total number of RTP payload bytes received for this stream;
- integer PacketsLost that represents the total number of RTP payload bytes lost for this stream;
- integer FractionLost that represents the total number of lost packets divided by the number of expected packets expressed as a fixed point number with a binary point at the left of the lower eight bits; if the loss is negative due to duplicates, the FractionLost is set to 0;
- integer CorruptedPackets that represents the total number of RTP packets that have been dropped due to transport layer CRC; PacketLost and Corrupted packets may allow to know about the source of the loss;
- integer Overruns that represents the total number of times the receive jitter buffer has overrun for this stream;
- integer Underruns that represents the total number of times the receive jitter buffer has underrun for this stream;
- integer ReceiveInterarrivalJitter that represents the current receive interarrival jitter in microseconds; it is calculated from J(i) as defined in section 6.4 of RFC3550), with units converted to microseconds; and
- integer AverageReceiveInterarrivalJitter that represents the average receive interarrival jitter in microseconds since the beginning of the current call; it is calculated as the average of D(i,j) as defined in section 6.4 of RFC3550, with units converted to microseconds.

During step 53, the video device (s) answers with a response GetParameterAttributesResponse with STBDevice.{i}.AVProfile.AVPlayer{i}. RTP.RTCP.Stats associated with the arguments as described above.

When command related to a reset of RTP statistics is received during step 51, the configuration server 20 sends to the corresponding video device(s) 23 a request SetParameterValues including the object STBDevice.{i}.AVProfile.AVPlayer{i}.RTP.RTCP.Stats.ResetStatistics, according to the command of step 51. Advantageously, RTP statistics may also be reset when read.

Figure 6:
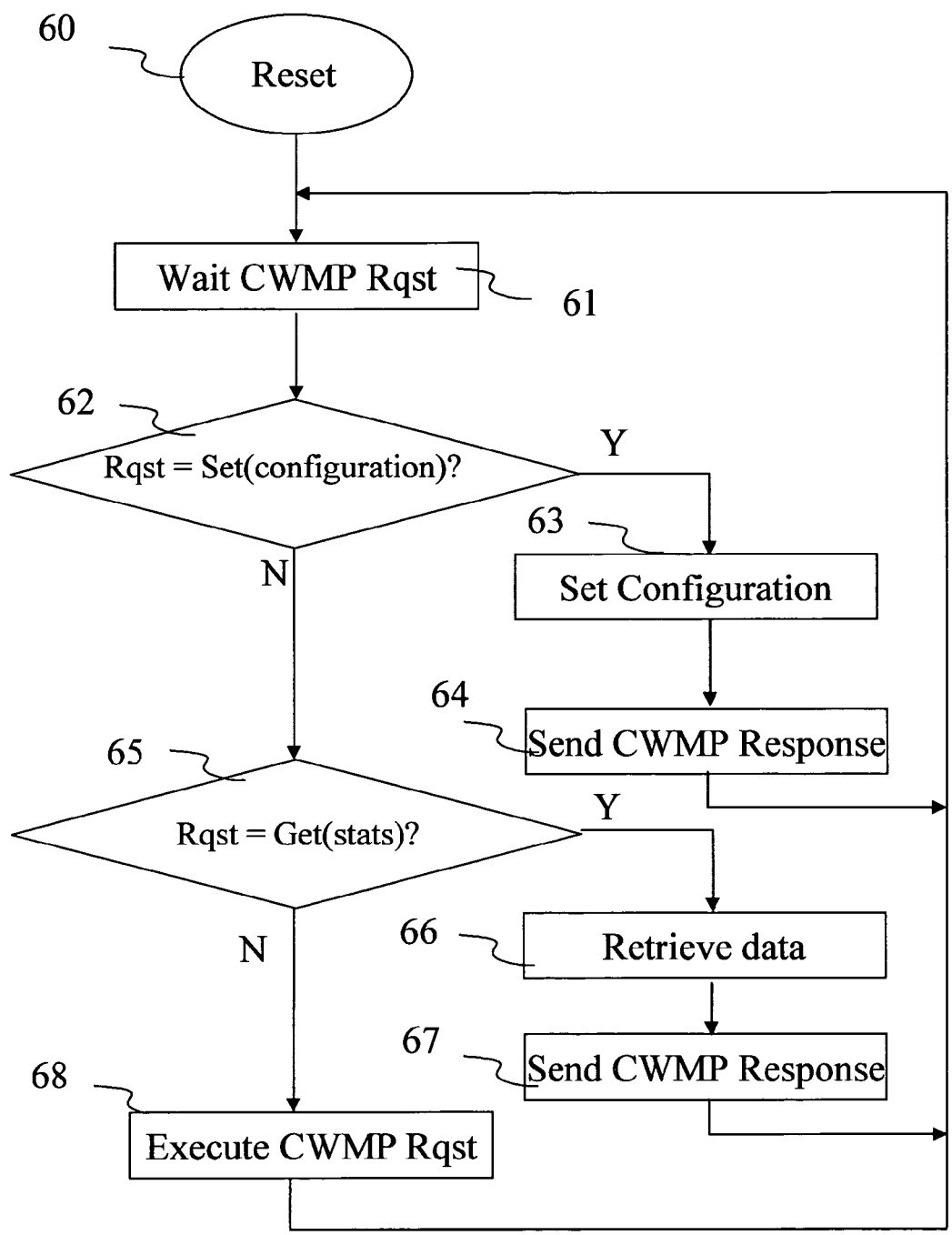

FIG. 6 discloses a method that is implemented in the video device 23 according to the specific embodiments of the invention.

The method begins with an reset step 60, where the different configuration data of the video device itself are initialized (e.g. IP address of server 20, its default profiles, data related to the audio/video broadcaster, user, reset of internal statistics, . . . ).

Then, during a step 61, the video device 23 waits and receives a CWMP request from the server 60.

Then, during a test 62, the device 23 checks if the command corresponds to a configuration set, i.e. a request SetParameterValues related to one of the object used for configuration as described above.

If so, during a step 63, the device 23 sets the configuration according to the object and arguments used in the received configuration request. Then, during a step 64, the device 24 sends a response to the server 20, indicating that the configuration has been done. After the step 64, step 61 is reiterated.

After test 62, if the command does not correspond to a configuration set, during a test 65, the device 23 checks if the command corresponds to a statistics retrieval, i.e. a request GetParameterAttributes related to one of the object used for statistic retrieval (audience statistics or AV stream statistics) as described above.

If so, during a step 66, the device 23 send requested statistics according to the object and arguments used in the received request. Then, during a step 67, the device 23 sends a response to the server 20, with the requested statistic data. After the step 67, step 61 is reiterated.

Else, during a step 68, the device 23 executes the CWMP request and step 61 is reiterated.

Figure 7:
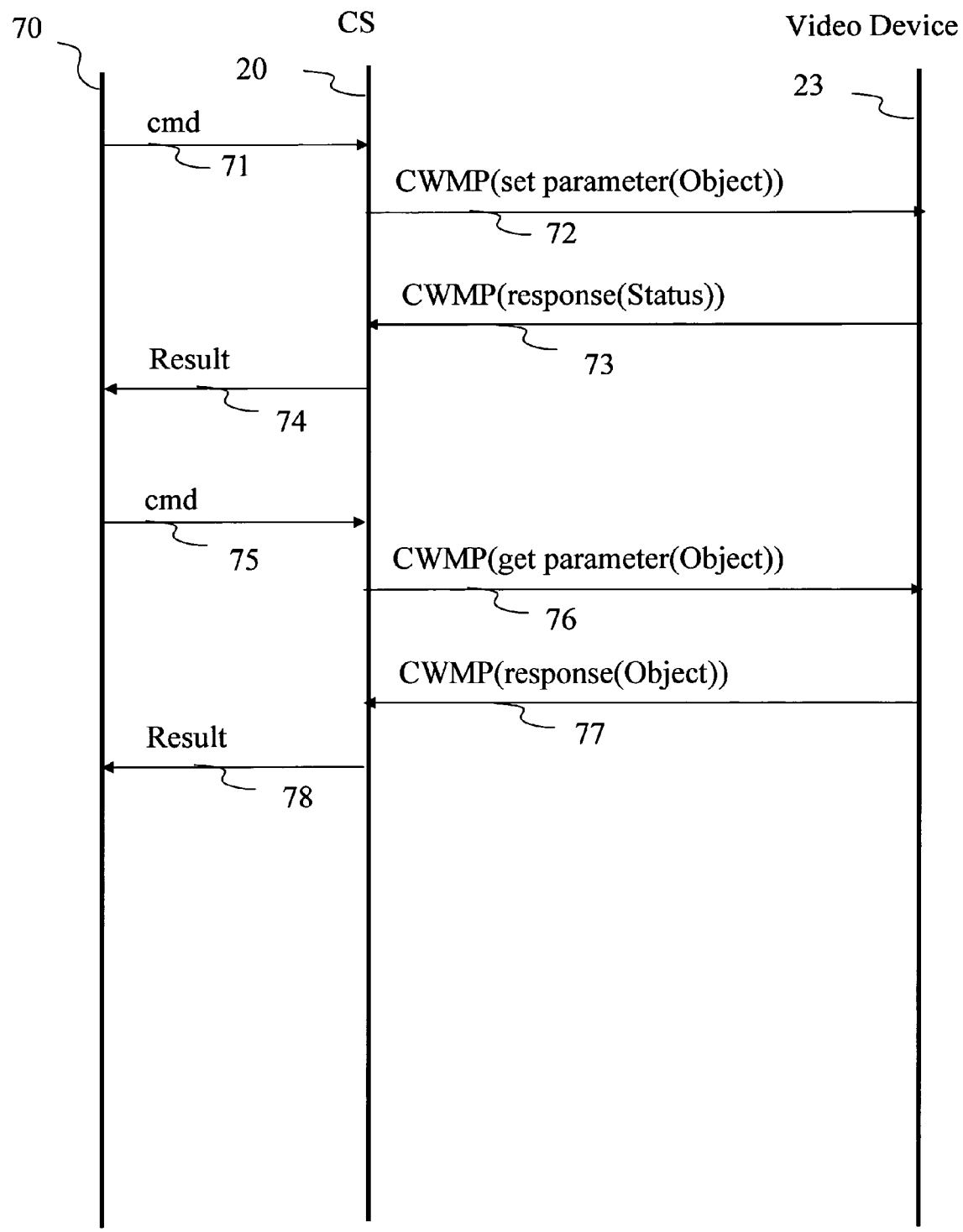
FIG. 7 presents an example of communication exchanges between elements of network of FIG. 2.

FIG. 7 presents an example of communication exchanges between server 20, device 23 and a user or control machine 70.

At reception of a configuration command 71 sent by the user or machine 70, the server 20 builds and send a CWMP command 72 as indicated in step 52 of FIG. 5 to the video device 23.

Then, the video device 23 builds and sends back a response 73 as indicated in step 64 of FIG. 5 to the video device 23 and the result 74 of the configuration is given by the server 20 to the user or control machine 70.

At reception of a statistic request command 71 sent by the user or machine 70, the server 20 builds and send a CWMP command 76 as indicated in step 52 of FIG. 5 to the video device 23.

Then, the video device 23 builds and sends back a response 77 as indicated in step 67 of FIG. 5 to the video device 23 and the required statistics data 78 of the configuration is given by the server 20 to the user or control machine 70.

Many scenarios can be advantageously defined according to the invention and synergy exists between various configuration requests and/or statistics retrieval. For instance, if a lost of packets is detected after the sending of a request of statistics related to video stream buffer (argument PacketsLost of STBDevice.{i}.AVProfile.AVPlayer{i}. MPEG2-TS.Stats object), then the precise nature of problem can be detected (for example, overrun of buffer) by requesting the corresponding statistics (or an general CWMP command requesting to upload the precise nature of problem (eg with a predefined string or integer). Then, the configuration server 20 can configure with the appropriate CWMP command the initial level of the video stream buffer and/or its size and upload again statistics with CWMP command to check if the new configuration has solved the problem.

Thus an implementation of the invention enable to have, advantageously, a uniform protocol for the gateway and STB; as TR069 is used for gateway, the whole remote management system of video devices (STB) and gateway is simplified if it is also used for both devices. In addition, the protocol is reliable as RPC (remote procedure call) (rather than message exchange) is used over TCP: the get and set parameter functions are remotely made. More generally, the invention enables remote trouble shooting and remote configuration of a STB from an configuration server (e.g. an ACS). The data model according to the invention is compliant to the TR-069 framework and allows various operations of remote management using TR-069 protocols.

Furthermore, the invention is proposing a remote management method enabling a distant remote management server to manage a distant audio/video device. Advantageously, the management method comprises a transmission and/or reception step of a command and/or corresponding answer (e.g. CWMP commands and/or answer) associated to the management of the zapping time. This zapping time can be the time between a service change and the real video play out. It depends on buffering levels, dejittering and/or IGMP priority. These parameters can be precisely tuned according to various statistics that can be recovered by a server (for instance a configuration server), that are advantageously uploaded through the same protocol as the configuration protocol.

Naturally, the invention is not limited to the embodiments described above.

In particular, other types or formats of request or response commands can be used according to the invention. In the description, examples based on TR069 have been given. Indeed, other functions compliant or not with TR069 can be implemented according to the invention.

In addition, structures, formats and names of objects (linked to configuration or statistics) are not limited to examples of table 1 and can be changed according to specific implementations of the invention. For example, boolean formats can be changed into string or integer formats; integer (respectively string) format can be changed into string (respectively integer format, an integer corresponding to a predefined argument). Other structures of objects are also compliant with the invention: for instance, some of structures defined in table 1 can be splitted into several structures (e.g. structures related to statistics with many possible arguments can be defined with several structures, each being related to one or several specific arguments), or, in the contrary gathered in one structure. Names of objects and arguments are given to illustrate a specific embodiment. Of course, they can be changed according to specific implementation. In addition, other configuration commands or statistics retrieval functions can be added to the above list.

Furthermore, all objects defined above are not mandatory in some specific implementation. For instance, configuration of dejittering can be implemented while IGMP priority configuration is or is not implemented; in a dual manner, configuration of IGMP priority can be implemented while configuration of dejittering is or is not implemented. For example, configuration of RTP (respectively video stream) dejittering can be implemented while configuration of video stream (respectively RTP) dejittering is or is not implemented. Also, retrieval of statistics (respectively configuration) as define above can be implemented or not, while configuration (respectively retrieval of statistics) as defined above is implemented.

In addition, the invention is not limited to the used of CWMP protocol but concerns also any protocol that enable a server to apply remotely a configuration and/or data retrieval function directly on an object in a distant video device.

The invention is not limited to the network structure of FIG. 2, but concerns also various structure including one or several management servers that can send commands to one or several remote devices, these devices being video devices or proxy associated to one or several video devices, directly or through a gateway. The video devices are not limited to set top box but concerns also TV sets, computer, laptop, fixed or mobile communication devices . . . .

The invention concerns also computer programs or medium comprising such programs that contains instructions adapted to implement the management method (on server and/or video device side) according to the invention as defined above.

The invention concerns also a remote management model as defined above (e.g. in table 1) and to be used with a protocol such as CWMP.

In particular the invention concerns, a remote management model for a video device (eg. a STB) allowing the operator to dynamically manage the MPEG2 TS encapsulation used by the set top box to receive digital programs. It concerns also, a remote management model for a a video device (eg. a STB) allowing selecting remotely the video device clock recovery mechanism. In addition, it concerns a remote management model for a a video device (eg. a STB) allowing remotely changing the priority of the IGMP traffic issued from the video device. It concerns also a remote management model for a a video device (eg. a STB) allowing configuring alarm triggered by the video device relatives to its input buffer filling level. Furthermore, the invention concerns a remote management model for a a video device (eg. a STB) allowing recording remotely audience statistics relative to the video device usage. The invention concerns also a remote management model for a video device (eg. a STB) allowing to identify the probable cause of delivery problems.

The invention concerns also a server, a gateway, a proxy or a video device (eg. a STB) comprising means to implement a remote management model as described in this specification, and more generally networks or communication system comprising such server and/or video device.

Parameter Definitions

Table 1 given in annex lists the objects associated with a STB CPE device and their associated parameters according to an embodiment of the invention. The notation used to indicate the data type of each parameter, and the notation associating with multi-instance objects, follows the notation defined in TR106 DSL Forum Technical Report (entitled "Home Network Data Model Template for TR-069-Enabled Devices").

The first column of table 1 represents the full name of a Parameter is the concatenation of the root object name as defined in TR106 DSL Forum Technical Report, the object name shown in the yellow header, and the individual Parameter name.

The second column of table 1 represents the type of the parameter (eg object (that comprises one or several parameters), a string of 256 characters (noted string(256), a boolean, an unsigned integer (noted unsignedInt)).

The third and fourth column represent respectively the write and read status, where "R", "O", "C" and "-" means respectively Required, Optional, Conditional and Not present. Write access for an object indicates whether the AddObject and DeleteObject actions are not allowed ("-"), optionally allowed ("O"), required ("R"), or conditionally required if the object is supported at all ("C"). Read access for an object indicates whether or not the object is optional ("O"), required ("R"), or conditionally required ("C") if the CPE supports the related functionality or if the object containing it is present.

The fifth column describes the corresponding parameter.

The sixth column represents the default value of the parameter on creation of an object instance via TR-069. If the default value is an empty string, this is represented by the symbol <Empty>.

In addition, main objects used by the management method according to the invention are in bold characters.

ANNEX: TABLE 1

Parameter list for a video device (e.g. a STB CPE device) according to the invention

| Name | Type | Write | Read | Description | Default |
|---|---|---|---|---|---|
| .STBDevice.{i}. | object | — | R | The top-level object for a STB CPE device. | — |
| .STBDevice.{i}.Capabilities. | object | — | R | The overall capabilities of the STB CPE. | — |
| AudioPlayer | string(256) | — | R | Comma-separated list of audio standards supported by this device when a an audio player is used without any video. Possible items are:<br>"MPEG1-Part3-Level1"<br>"MPEG1-Part3-Level2"<br>"MPEG1-Part3-Level3"<br>"MPEG2-Part3-Level1"<br>"MPEG2-Part3-Level2"<br>"MPEG2-Part3-Level3"<br>"MPEG2-AAC-MP" Main Profile<br>"MPEG2-AAC-LP" Low Profile<br>"MPEG2-AAC-SSRP" Scalable sampling Rate Profile<br>The list MAY include vendor-specific protocols, which MUST be prefixed with "X-", and SHOULD follow with a valid URN. For example:<br>"X-urn:example-com:MyProt" | — |
| AVPlayer | string(256) | — | R | Comma-separated list of video standards supported by this device. Possible items are:<br>"MPEG2-Part2"<br>"MPEG4-Part2"<br>"MPEG4-Part10"<br>"WM9"<br>The list MAY include vendor-specific protocols, which MUST be prefixed with "X-", and SHOULD follow with a valid URN. For example:<br>"X-urn:example-com:MyProt" | |
| NumberOfAVPlayers | unsignedInt | — | R | Number of AV players supported by the device. AV players include PIP support as well as PVR support. It describes the maximum number of streams the device is able to support simultaneousely. This is the strict maximum, but depending on the streams to be decoded a given STB may not always have the resources to run these players, e.g. it may be able to decode one main picture and one PIP in standard definition, but just a main picture and no PIP in high definition. | — |

ANNEX: TABLE 1-continued

Parameter list for a video device (e.g. a STB CPE device) according to the invention

| Name | Type | Write | Read | Description | Default |
|---|---|---|---|---|---|
| AnalogVideoStandard | string(256) | — | R | Comma-separated list of analog video standard supported for for video output Each item is taken from the list: "NTSC" "PAL" "SECAM" | |
| MPEG2Transport | boolean | — | R | Support for MPEG2-TS encapsulation. A true value indicates MPEG2-TS is supported for AV streaming | |
| NetworkTransport | string(256) | — | R | Comma-separated list of network protocol stack supported for AV streaming. Each item is taken from the list: "UDP" "TCP" "RTP" (This stands for RTP over UDP over IP) The list MAY include vendor-specific transports, which MUST be prefixed with "X-", and SHOULD follow with a valid URN. | |
| RTCP | boolean | — | C | Support for RTCP. A true value indicates the device is able to send RTCP receiver reports. | — |
| PVR | boolean | — | R | Support for PVR functions. A true value indicates the device contains a PVR. | |
| SmartCard | boolean | — | R | Support for Conditional Access via a smart card. A true value indicates the device contains CA capabilities. | |
| .STB.Device.{i}.Capabilities.PVR | object | — | C | Object describing the characteristics of the PVR if any | — |
| Capacity | unsignedInt | — | R | Total number of Kbytes available for AV storage | |
| .STB.Device.{i}.Capabilities.MPEG2-Part2 | object | — | R | Object describing the set of supported profiles and levels for this AVPlayer. It also describes the set of Audio standards supported when MPEG2 Part 2 is used as video standard | — |
| Audio | string(256) | — | R | Comma-separated list of supported Audio Standards supported by the Player when decoding MPEG2 Part2. Each item is taken from: "MPEG1-Part3-Level1" "MPEG1-Part3-Level2" "MPEG1-Part3-Level3" "MPEG2-Part3-Level1" "MPEG2-Part3-Level2" "MPEG2-Part3-Level3" "MPEG2-AAC-MP" Main Profile "MPEG2-AAC-LP" Low Profile "MPEG2-AAC-SSRP" Scalable sampling Rate Profile | |
| .STB.Device.{i}.Capabilities.MPEG2-Part2.Profile@Level | object | — | R | Table to describe the set of profiles and levels combinations supported by the STB when MPEG2 Part 2 is used as video standard. Each entry in this table refers to a distinct combination of profile and level. The table MUST include a distinct entry for each supported combination of these parameters. | — |
| EntryID | unsignedInt[1:] | — | R | Unique identifier for each entry in this table. | — |
| Profile | string(64) | — | R | Identifier of the MPEG2 part 2 profile, taken from the list: "SP" Simple Profile "MP" Main Profile "SNR" SNR Scalable "Spt" Spatially Scalable "HP" High Profile "4:2:2" | |
| Level | string(64) | — | R | Identifier of the MPEG2 part 2 level, taken from the list "LL" Low Level | |

ANNEX: TABLE 1-continued

Parameter list for a video device (e.g. a STB CPE device) according to the invention

| Name | Type | Write | Read | Description | Default |
|---|---|---|---|---|---|
| | | | | "ML" Main Level<br>"H-14" High-1440<br>"HL" High Level | |
| .STB.Device.{i}.Capabilities.MPEG4-Part2 | object | — | C | Object describing the set of supported profiles for this AVPlayer. It also describes the set of Audio standards supported when MPEG4 Part 2 is used as video standard | — |
| Audio | string(256) | — | C | Comma-separated list of supported Audio Standards supported by the Player when decoding MPEG2 Part2. Each item is taken from:<br>"MPEG1-Part3-Level1"<br>"MPEG1-Part3-Level2"<br>"MPEG1-Part3-Level3"<br>"MPEG2-Part3-Level1"<br>"MPEG2-Part3-Level2"<br>"MPEG2-Part3-Level3"<br>"MPEG2-AAC-MP" Main Profile<br>"MPEG2-AAC-LP" Low Profile<br>"MPEG2-AAC-SSRP" Scalable sampling Rate Profile | |
| .STB.Device.{i}.Capabilities.MPEG4-Part2.Profile@Level | object | — | C | Table to describe the set of profiles and levels combinations supported by the STB when MPEG4 Part 2 is used as video standard. Each entry in this table refers to a distinct combination of profile and level. The table MUST include a distinct entry for each supported combination of these parameters. | — |
| EntryID | unsignedInt[1:] | — | C | Unique identifier for each entry in this table. | — |
| Profile | string(64) | — | C | Identifier of the MPEG4 part 2 profile, taken from the list:<br>"SIMPLE"<br>"SIMPLE SCALABLE"<br>"CORE"<br>"CORE SCALABLE"<br>"ADVANCED CORE"<br>"MAIN"<br>"N-BIT"<br>"ADVANCED REAL TIME SIMPLE"<br>"ADVANCED CODING EFFICIENCY"<br>"SIMPLE STUDIO"<br>"CORE STUDIO"<br>"ADVANCED SIMPLE"<br>"FINE GRANULARITY SCALABLE"<br>"ADVANCED SCALABLE TEXTURE"<br>"ANIMATED 2D MESH"<br>"BASIC ANIMATED TEXTURE"<br>"STILL SCALABLE TEXTURE"<br>"SIMPLE FACE"<br>"SIMPLE FBA" | |
| Level | string(64) | — | C | Identifier of the MPEG4 part 2 level, taken from the list:<br>"L5"<br>"L4"<br>"L4a"<br>"L3b"<br>"L3"<br>"L2"<br>"L1"<br>"L0" | |
| .STB.Device.{i}.Capabilities.MPEG4-Part10 | object | — | C | Object describing the set of supported profiles and levels for this AVPlayer. It also describes the set of Audio standards supported when MPEG4 Part 10 is used as video standard | — |
| Audio | string(256) | — | C | Comma-separated list of supported Audio Standards supported by the Player when decoding MPEG2 Part2. Each item is an enumeration of:<br>"MPEG1-Part3-Level1" | |

ANNEX: TABLE 1-continued

Parameter list for a video device (e.g. a STB CPE device) according to the invention

| Name | Type | Write | Read | Description | Default |
|---|---|---|---|---|---|
| | | | | "MPEG1-Part3-Level2"<br>"MPEG1-Part3-Level3"<br>"MPEG2-Part3-Level1"<br>"MPEG2-Part3-Level2"<br>"MPEG2-Part3-Level3"<br>"MPEG2-AAC-MP" Main Profile<br>"MPEG2-AAC-LP" Low Profile<br>"MPEG2-AAC-SSRP" Scalable sampling Rate Profile | |
| .STB.Device.{i}.Capabilities.MPEG4-Part10.Profile@Level | object | — | C | Table to describe the set of profiles and levels combinations supported by the STB when MPEG4 Part 10 is used as video standard. Each entry in this table refers to a distinct combination of profile and level. The table MUST include a distinct entry for each supported combination of these parameters. | — |
| EntryID | unsignedInt[1:] | — | C | Unique identifier for each entry in this table. | — |
| Profile | string(256) | — | C | Comma-separated list of supported MPEG4 Part 10 profiles. Each item is an enumeration of:<br>"BASELINE"<br>"MAIN"<br>"EXTENDED"<br>"HIGH"<br>"HIGH 10"<br>"HIGH 4:2:2"<br>"HIGH 4:4:4" | |
| Level | string(256) | — | C | Comma-separated list of supported MPEG4 Part 10 Levels. Each item is an enumeration of:<br>"1" "1b" "1.1" "1.2" "1.3"<br>"2" "2.1" "2.2" "3" "3.1" "3.2"<br>"4" "4.1" "4.2" "5" "5.1" | |
| .STB.Device.{i}.Capabilities.WM9 | object | — | C | Object describing the set of supported profiles and levels for this AVPlayer. It also describes the set of Audio standards supported when WM9 is used as video standard | — |
| Audio | string(256) | — | C | Comma-separated list of supported Audio Standards supported by the Player when decoding MPEG2 Part2. Each item is an enumeration of:<br>"MPEG1-Part3-Level1"<br>"MPEG1-Part3-Level2"<br>"MPEG1-Part3-Level3"<br>"MPEG2-Part3-Level1"<br>"MPEG2-Part3-Level2"<br>"MPEG2-Part3-Level3"<br>"MPEG2-AAC-MP" Main Profile<br>"MPEG2-AAC-LP" Low Profile<br>"MPEG2-AAC-SSRP" Scalable sampling Rate Profile | |
| .STB.Device.{i}.Capabilities.WM9.Profile@Level | object | — | C | Table to describe the set of profiles and levels combinations supported by the STB when WM9 is used as video standard. Each entry in this table refers to a distinct combination of profile and level. The table MUST include a distinct entry for each supported combination of these parameters. | — |
| EntryID | unsignedInt[1:] | — | C | Unique identifier for each entry in this table. | — |
| Profile | string(256) | — | C | Comma-separated list of supported WM9 profiles. Each item is an enumeration of:<br>"" | |
| Level | string(256) | — | C | Comma-separated list of supported WM9 Levels. Each item is an enumeration of:<br>"1" | |
| .STB.Device.{i}.AVProfile. | object | C | R | Object associated with a collection of AVPlayers with common characteristics. By default, the AVProfile object SHOULD be initially in the disabled state. | — |

ANNEX: TABLE 1-continued

Parameter list for a video device (e.g. a STB CPE device) according to the invention

| Name | Type | Write | Read | Description | Default |
|---|---|---|---|---|---|
| Enable | boolean | R | R | Enables or disables all AV Players in this profile, or places it into a quiescent state. A TRUE value indicates the AVProfile is enabled | False |
| Reset | boolean | R | R | When written as true, forces the all AV Players in the profile to be reset, causing it to re-initialize and perform all start-up actions if any. Always False when read. | — |
| ActiveAVPlayerNumber | unsignedInt | — | R | Number of AV Players currently active (i.e. processing an AV stream) | |
| InformationMsg | string(256) | R | — | Human-readable string to be displayed on the TV via the STB on screen display. Message removal from the TV screen is to be done using STB proprietary means (such as request the user to press a key to remove the message) | |
| SmartCardInfo | string(64) | — | R | String describing the status of the Smart card. The string shall belong to the following list:<br>"NONE" when no smart card is detected<br>"ACTIVE" when a smart card is inserted and running<br>"ERROR" | |
| .STB.Device.{i}.AVProfile.Middleware | object | — | C | Object describing the characteristics of the PVR if any | — |
| FrameWork | string(64) | — | R | String describing middleware framework being used in the STB. This can be either proprietary middleware or a standard middleware. | |
| Version | string(64) | — | R | A string identifying the middleware version currently installed in the STB. To allow version comparisons, this element SHOULD be in the form of dot-delimited integers, where each successive integer represents a more minor category of variation. For example, 3.0.21 where the components mean: Major.Minor.Build. | |
| URL | string(256) | R | R | URL where to access the middleware for download purposes. This parameter MUST contain the full path to the folder containing the software image. | |
| Protocol | string(64) | 5 | R | String describing the protocol to be used to download the middleware. The string shall belong to the following list:<br>"HTTP"<br>"FTP"<br>"TFTP"<br>"mTFTP" | |
| UserName | string(256) | O | — | Username used to authenticate the STB when making a connection to the ACS using the CPE WAN Management Protocol. This username is used only for HTTP or FTP-based authentication of the STB. | |
| Password | string(256) | R | — | Password used to authenticate the STB when making a connection to the ACS using the WAN Management Protocol. This password is used only for HTTP or FTP-based authentication of the STB. When read, this parameter returns an empty string, regardless of the actual value. | |
| FileNames | string(64) | R | R | Comma-separated list of file names for middleware modules. | |
| .STBDevice.{i}.AVProfile.ServiceProviderInfo. | object | — | O | Information regarding the organization providing service for this AV profile instance. | — |
| Name | string(256) | O | O | Human-readable string identifying the service provider. | <Empty> |
| URL | string(256) | O | O | URL of the service provider for this profile instance. | <Empty> |

ANNEX: TABLE 1-continued

Parameter list for a video device (e.g. a STB CPE device) according to the invention

| Name | Type | Write | Read | Description | Default |
|---|---|---|---|---|---|
| ContactPhoneNumber | string(32) | O | O | Phone number to contact the service provider for this profile instance. | <Empty> |
| EmailAddress | string(256) | O | O | Email address to contact the service provider for this profile instance. | <Empty> |
| .STBDevice.{i}.AVProfile.IGMP. | object | — | O | AV profile parameters that are specific to IGMP clients when it is used for channel zapping. | — |
| DSCPMark | unsignedInt[0:63] | O | O | Diffserv code point to be used for outgoing IGMP packets. | 0 |
| VLANIDMark | int[−1:] | O | O | VLAN ID (as defined in 802.1Q) to be used for outgoing IGMP packets for this profile. A value of −1 indicates the default value is to be used. If either the VLANIDMark or EthernetPriorityMark are greater than zero, then the outgoing frames MUST be tagged. Otherwise, the outgoing frames MAY be tagged or untagged. | −1 |
| EthernetPriorityMark | int[−1:] | O | O | Ethernet priority code (as defined in 802.1D) to be used for outgoing IGMP packets for this profile. A value of −1 indicates the default value is to be used. If either the VLANIDMark or EthernetPriorityMark are greater than zero, then the outgoing frames MUST be tagged. Otherwise, the outgoing frames MAY be tagged or untagged. | −1 |
| .STBDevice.{i}.AVProfile.PVR. | object | — | C | AV profile parameters that are specific to the embedded PVR. | — |
| FreeSpace | unsignedInt | — | R | Number of available Kbytes for AV storage | — |
| .STBDevice.{i}AVProfileAVPlayer.{i} | object | — | C | AV profile parameters related to a particular AV stream. It correspond to an AV Player | |
| StreamUserStatus | string(64) | — | R | Single string describing the status of the AV stream as currently used. The string shall belong to the following list: "MAIN-DISPLAY" "PIP" "TO-PVR" "FROM-PVR" | |
| ServiceName | string(64) | — | R | String describing the channel | |
| VideoStandard | string(256) | — | R | Single string describing the type of video standard currently processed by the AV Player. The string shall belong to the following list: "NONE" "MPEG2-Part2" "MPEG4-Part2" "MPEG4-Part10" The list MAY include vendor-specific protocols, which MUST be prefixed with "X-", and SHOULD follow with a valid URN. For example: "X-urn:example-com:MyProt" | — |
| AudioStandard | string(256) | — | R | Single string describing the type of audio standard currently processed by the AV Player. The string shall belong to the following list: "NONE" "MPEG1-Part3-Level1" "MPEG1-Part3-Level2" "MPEG1-Part3-Level3" "MPEG2-Part3-Level1" "MPEG2-Part3-Level2" "MPEG2-Part3-Level3" "MPEG2-AAC-MP" Main Profile "MPEG2-AAC-LP" Low Profile "MPEG2-AAC-SSRP" Scalable sampling Rate Profile The list MAY include vendor-specific | — |

ANNEX: TABLE 1-continued

Parameter list for a video device (e.g. a STB CPE device) according to the invention

| Name | Type | Write | Read | Description | Default |
|---|---|---|---|---|---|
| | | | | protocols, which MUST be prefixed with "X-", and SHOULD follow with a valid URN. For example: "X-urn:example-com:MyProt" | |
| AudioLanguage | string(64) | — | R | String describing the audio language being currently processed by the AV player (Human readable). | |
| SubtitlingStatus | boolean | — | R | Describes whether the subtitiling is currently activated or not. A True value indicates the subtitling is enabled | |
| SubtitilingLanguage | string(64) | — | R | String describing the sutitlling language being currently processed by the AV player (Human readable). | |
| .STB.Device.{i}.AVProfile.AVPlayer.{i}.MPEG2-Part2 | object | — | C | Object describing the current MPEG2 Part 2 profile and level being processed by this AVPlayer. | — |
| Profile | string(256) | — | C | Single string describing the video profile currently processed by the AV Player. The string shall belong to the following list:<br>"SP" Simple Profile<br>"MP" Main Profile<br>"SNR" SNR Scalable<br>"Spt" Spatially Scalable<br>"HP" High Profile<br>"4:2:2" | |
| Level | string(256) | — | C | Single string describing the video level currently processed by the AV Player. The string shall belong to the following list:<br>"LL" Low Level<br>"ML" Main Level<br>"H-14" High-1440<br>"HL" High Level | |
| .STB.Device.{i}.AVProfile.AVPlayer.{i}.MPEG4-Part2 | object | — | C | Object describing the current MPEG4 Part 2 profile and level being processed by this AVPlayer. | — |
| Profile | string(64) | — | C | Single string describing the video profile currently processed by the AV Player. The string shall belong to the following list:<br>"SIMPLE"<br>"SIMPLE SCALABLE"<br>"CORE"<br>"CORE SCALABLE"<br>"ADVANCED CORE"<br>"MAIN"<br>"N-BIT"<br>"ADVANCED REAL TIME SIMPLE"<br>"ADVANCED CODING EFFICIENCY"<br>"SIMPLE STUDIO"<br>"CORE STUDIO"<br>"ADVANCED SIMPLE"<br>"FINE GRANULARITY SCALABLE"<br>"ADVANCED SCALABLE TEXTURE"<br>"ANIMATED 2D MESH"<br>"BASIC ANIMATED TEXTURE"<br>"STILL SCALABLE TEXTURE"<br>"SIMPLE FACE"<br>"SIMPLE FBA" | |
| Level | string(64) | — | C | Single string describing the video level currently processed by the AV Player. The string shall belong to the following list:<br>"L5"<br>"L4"<br>"L4a"<br>"L3b"<br>"L3"<br>"L2"<br>"L1"<br>"L0" | |
| .STB.Device.{i}.AVProfile.AVPlayer.{i}.MPEG4-Part10 | object | — | C | Object describing the current MPEG4 Part 10 profile and level being processed by this AVPlayer. | — |

ANNEX: TABLE 1-continued

Parameter list for a video device (e.g. a STB CPE device) according to the invention

| Name | Type | Write | Read | Description | Default |
|---|---|---|---|---|---|
| Profile | string(256) | — | C | Single string describing the video profile currently processed by the AV Player. The string shall belong to the following list: "BASELINE" "MAIN" "EXTENDED" "HIGH" "HIGH 10" "HIGH 4:2:2" "HIGH 4:4:4" | |
| Level | string(256) | — | C | Single string describing the video level currently processed by the AV Player. The string shall belong to the following list: "1" "1b" "1.1" "1.2" "1.3" "2" "2.1" "2.2" "3" "3.1" "3.2" "4" "4.1" "4.2" "5" "5.1" | |
| .STB.Device.{i}.AVProfile.AVPlayer.{i}.WM9 | object | — | C | Object describing the current WM9 profile and level being processed by this AVPlayer. | — |
| Profile | string(256) | — | C | Single string describing the video profile currently processed by the AV Player. The string shall belong to the following list: "" | |
| Level | string(256) | — | C | Single string describing the video level currently processed by the AV Player. The string shall belong to the following list: "" | |
| .STBDevice.{i}.AVProfile.AVPlayer.{i}.RTP. | object | — | C | AV profile parameters related to an AV stream sent via RTP. | |
| DejitteringEnable | boolean | C | C | Enable or disable RTP level dejittering (based on RTP Time stamp processing) | — |
| LocalPortMin | unsignedInt[0:65535] | C | C | Base of port range to be used for incoming RTP streams for this profile. | 0 |
| LocalPortMax | unsignedInt[0:65535] | C | C | Top of port range to be used for incoming RTP streams for this profile. | 0 |
| .STBDevice.{i}.AVProfile.AVPlayer{i}.RTP.Dejittering | object | — | C | AV profile parameters related to the dejittering of an AV stream using RTP transport | |
| BufferSize | unsignedInt | — | C | RTP dejittering buffer size in bytes (based on RTP Time stamp processing) | — |
| BufferInitialLevel | unsignedInt | C | C | Describes the number of bytes that shall be in the buffer before play-out can start | |
| BufferAlarmLowLevel | unsignedInt | C | C | Describes the buffer level (number of bytes) that will generate a buffer under flow event | |
| BufferAlarmHighLevel | unsignedInt | C | C | Describes the buffer level (number of bytes) that will generate a buffer over flow event | |
| .STBDevice.{i}.AVProfile.AVPlayer{i}.RTP.RTCP. | object | — | O | AV profile parameters related to RTCP support. If this object is supported, the capability STBDevice.{i}.Capabilities.RTCP MUST be equal to true. | — |
| Enable | boolean | C | C | Enable or disable RTCP. | — |
| TxRepeatInterval | unsignedInt[1:] | C | C | Transmission repeat interval, in milliseconds. | — |
| .STBDevice.{i}.AVProfile.AVPlayer{i}.RTP.Stats. | object | — | R | Statistics for this RTP stream instance. | — |
| ResetStatistics | boolean | R | R | When set to true, resets the statistics for this AV stream. Always False when read. | — |

ANNEX: TABLE 1-continued

Parameter list for a video device (e.g. a STB CPE device) according to the invention

| Name | Type | Write | Read | Description | Default |
|---|---|---|---|---|---|
| PacketsReceived | unsignedInt | — | R | Total number of RTP packets received for this stream. | — |
| BytesReceived | unsignedInt | — | R | Total number of RTP payload bytes received for this stream. | — |
| PacketsLost | unsignedInt | — | R | Total number of RTP packets that have been lost for this stream. | — |
| FractionLost | unsignedInt [0..255] | — | R | Total number of lost packets divided by the number of expected packets expressed as a fixed point number with a binary point at the left of the lower eight bits. If the loss is negative due to duplicates, the FractionLost is set to 0 | — |
| CorruptedPackets | unsignedInt | — | R | Total number of RTP packets that have been dropped due to transport layer CRC. PacketLost and Corrupted packets may allow to know about the source of the loss | — |
| Overruns | unsignedInt | — | C | Total number of times the receive jitter buffer has overrun for this stream. | — |
| Underruns | unsignedInt | — | C | Total number of times the receive jitter buffer has underrun for this stream. | — |
| ReceiveInterarrivalJitter | unsignedInt | — | O | Current receive interarrival jitter in microseconds. Calculated from J(i) as defined in section 6.4 of RFC 3550, "RTP: A Transport Protocol for Real-Time Appilcations" published on http://www.ietf.org/rfc/rfc3550.txt.), with units converted to microseconds. | — |
| AverageReceiveInterarrivalJitter | unsignedInt | — | O | Average receive interarrival jitter in microseconds since the beginning of the current call. Calculated as the average of D(i, j) as defined in section 6.4 of RFC 3550, with units converted to microseconds. | — |
| .STBDevice.{i}.AVProfile.AVPlayer{i}.MPEG2-TS. | object | — | C | AV profile parameters related to an AV stream sent via MPEG2-TS. | |
| Enable | boolean | C | C | Enable or disable MPEG2-TS transport layer processing. | — |
| .STBDevice.{i}.AVProfile.AVPlayer{i}.MPEG2-TS.Dejittering | object | — | C | AV profile parameters related to the dejittering of an AV stream using MPEG2-TS transport | |
| OperationMode | string(256) | O | C | Comma-separated list of supported operation mode "PCR LOCKED" "FREE" Where PCR LOCKED means that reading of the buffer is locked on received PCRs, and FREE means that reading is based on a free running clock. When the FREE mode is used, the BitRate parameter is used to determine the play out clock. | |
| BitRate | unsignedInt | C | C | In case of CBR, describes the bit rate of the MPEG2 TS AV stream in terms of bits per seconds | |
| BufferSize | unsignedInt | — | C | MPEG2 TS dejittering buffer size in bytes. Play out is done in either PCR LOCKED or FREE mode (based on a BitRate value) | — |
| BufferInitialLevel | unsignedInt | C | C | Describes the number of bytes that shall be in the buffer before play-out can start | |
| BufferAlarmLowLevel | unsignedInt | O | O | Describes the buffer level (number of bytes) that will generate a buffer under flow event | |
| BufferAlarmHighLevel | unsignedInt | O | O | Describes the buffer level (number of bytes) that will generate a buffer over flow event | |

ANNEX: TABLE 1-continued

Parameter list for a video device (e.g. a STB CPE device) according to the invention

| Name | Type | Write | Read | Description | Default |
|---|---|---|---|---|---|
| .STBDevice.{i}.AVProfile.AVPlayer{i}.MPEG2-TS.Stats. | object | — | R | Statistics for this AV stream instance. | — |
| ResetStatistics | boolean | R | R | When set to one, resets the statistics for this AV stream. Always False when read. | — |
| PacketsReceived | unsignedInt | — | R | Total number of MPEG2 TS packets received for this stream. | — |
| PacketsLost | unsignedInt | — | R | Total number of MPEG2 TS packets that have been lost for this stream. | — |
| Overruns | unsignedInt | — | R | Total number of times the receive jitter buffer has overrun for this stream. | — |
| Underruns | unsignedInt | — | R | Total number of times the receive jitter buffer has underrun for this stream. | — |
| .STB.Device.{i}.AVProfile.AudienceStats | object | O | O | Table to describe audience measurements. The purpose of this table is to record what the STB has been receiving. Time duration are recorded only for services being received in the main screen. Each entry corresponds to a given service | — |
| Reset | boolean | C | — | Used to reset the table | — |
| EntryID | unsignedInt[1:] | — | R | Unique identifier for each entry in this table. | — |
| ServiceName | string(64) | — | R | String describing the TV channel | — |
| Duration | unsignedInt | — | R | Describes the cumulative duration of this service in seconds | — |

The invention claimed is:

1. Remote management method for management of at least one distant audio/video device, said method being implemented by a distant remote management server, said method comprising a reception step of statistical data from said at least one distant audio/video device, allowing to detect a nature of a problem encountered by said at least one distant audio/video device, said statistical data being received after transmission of a Customer Premises Equipment Wide Area Network Management Protocol (CWMP) command of a request for statistical data, a transmission step performed by the distant remote management server of a CWMP command to said at least one distant audio/video device, requesting a configuration of RTP transport dejittering or video dejittering related parameters of said at least one distant device, a transmission step of a CWMP command to said at least one distant audio/video device, requesting a retrieval of statistical data from said at least one distant audio/video device, said statistical data allowing to check if said configuration has solved said problem encountered.

2. Method according to claim 1, wherein the configuration comprises an enable or disable of RTP dejittering in the at least a distant audio/video device.

3. Method according to claim 1, wherein the configuration comprises an enable or disable of video stream dejittering in the at least a distant audio/video device.

4. Method according to claim 1, wherein the configuration comprises an initial level of at least one buffer in the at least distant audio/video device.

5. Method according to claim 1, wherein the configuration comprises a clock recovery setting of the at least a distant audio/video device.

6. Method according to claim 1, wherein the configuration comprises a configuration of jittering alarm triggered by the at least a distant audio/video device.

7. Method according to claim 1, wherein the configuration comprises a configuration of the priority of the IGMP traffic issued from the at least a distant audio/video device.

* * * * *